Figure 1:
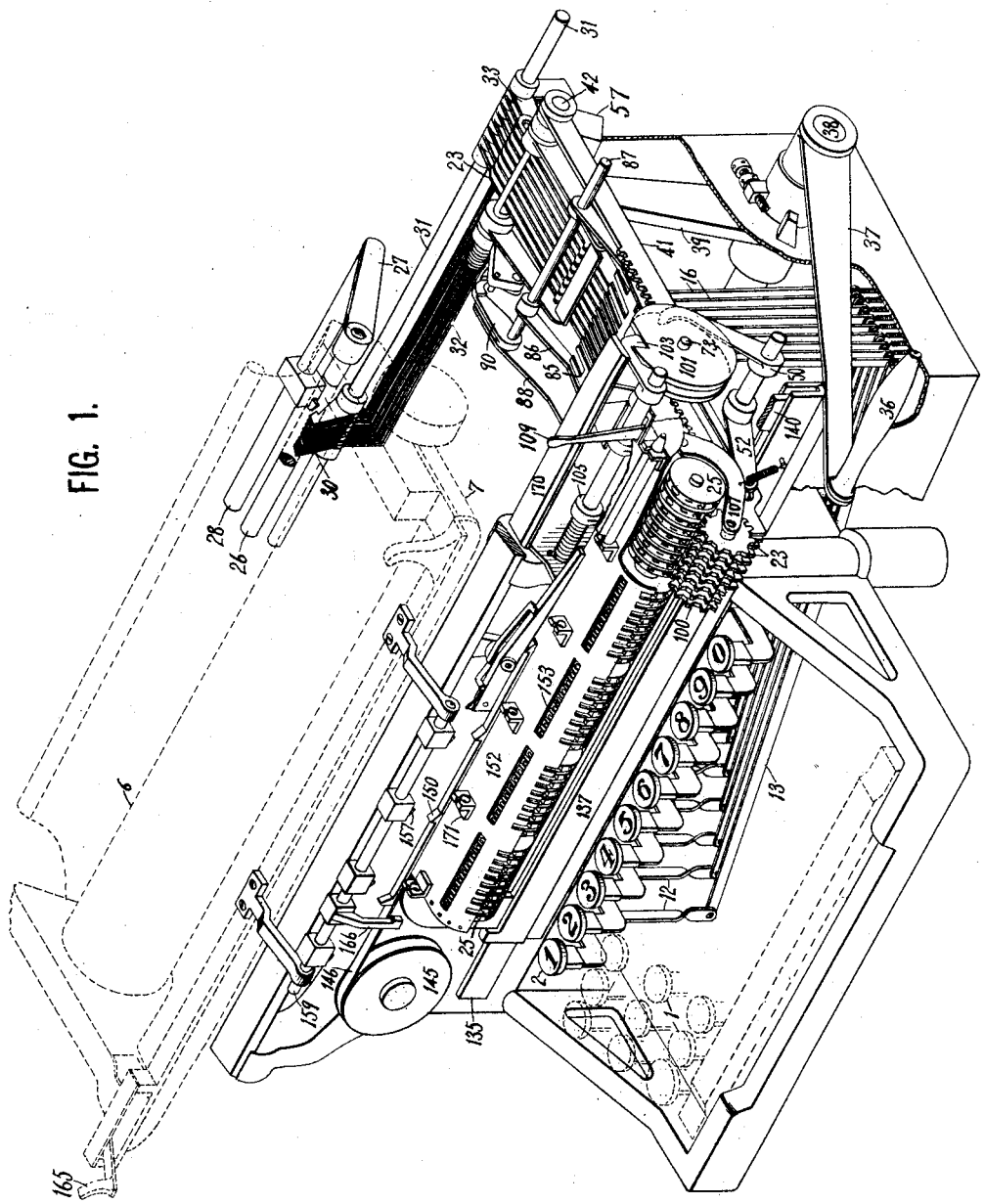

B. C. STICKNEY.
COMBINED TYPE WRITING AND COMPUTING MACHINE.
APPLICATION FILED MAR. 23, 1912.

1,186,520.

Patented June 6, 1916.
9 SHEETS—SHEET 1.

WITNESSES:
Julius Dackstine
F. E. Alexander

INVENTOR:
Burnham C. Stickney

B. C. STICKNEY.
COMBINED TYPE WRITING AND COMPUTING MACHINE.
APPLICATION FILED MAR. 23, 1912.

1,186,520.

Patented June 6, 1916.
9 SHEETS—SHEET 3.

WITNESSES:

INVENTOR:
Burnham C. Stickney

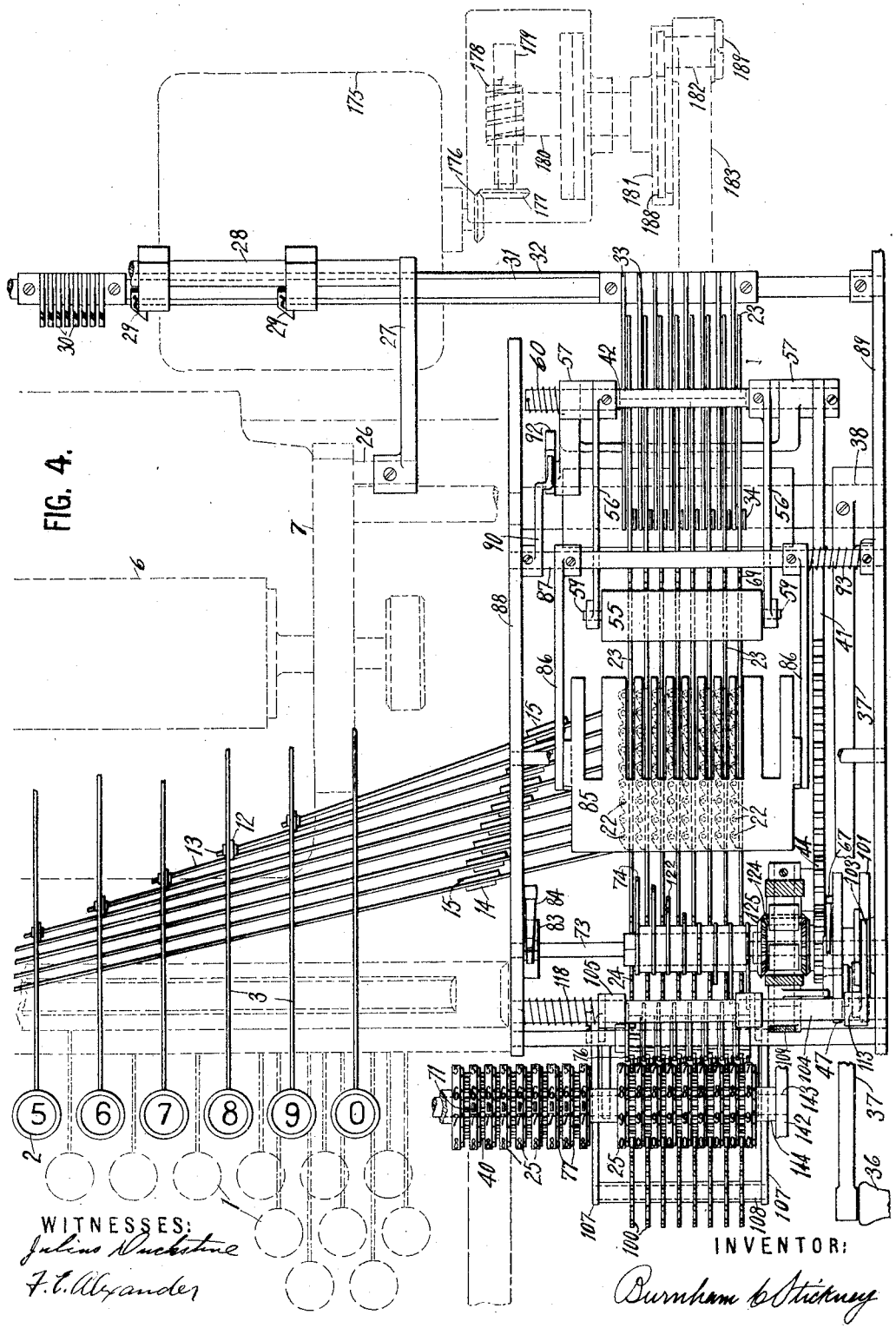

B. C. STICKNEY.
COMBINED TYPE WRITING AND COMPUTING MACHINE.
APPLICATION FILED MAR. 23, 1912.
1,186,520.
Patented June 6, 1916.
9 SHEETS—SHEET 5.
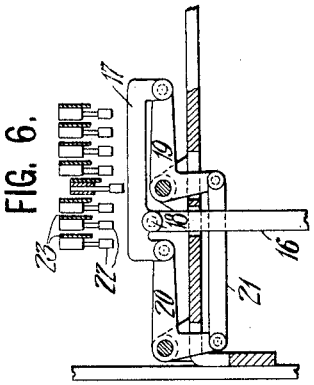
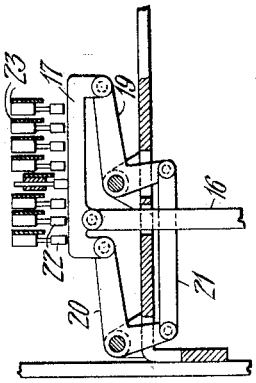
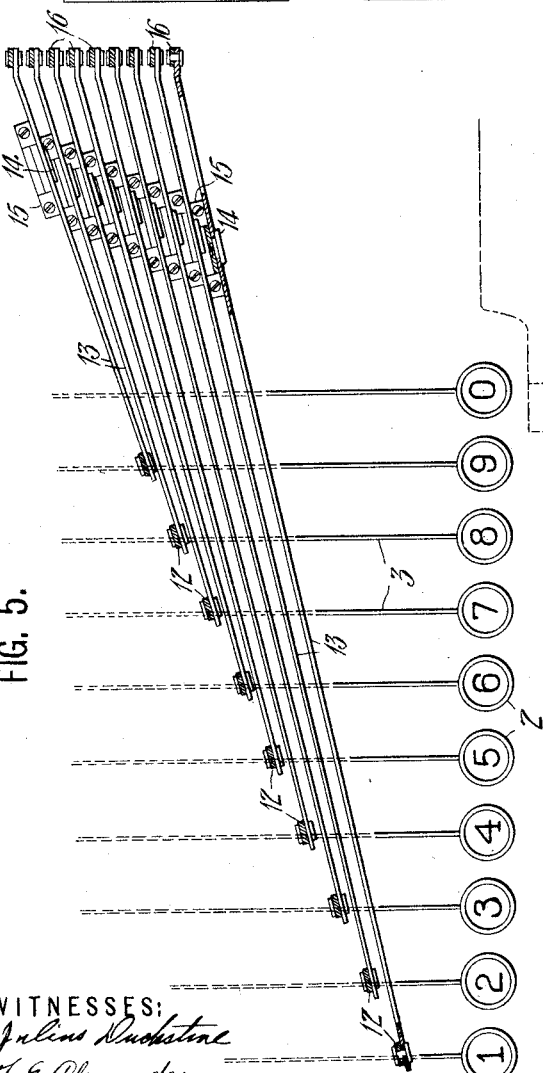
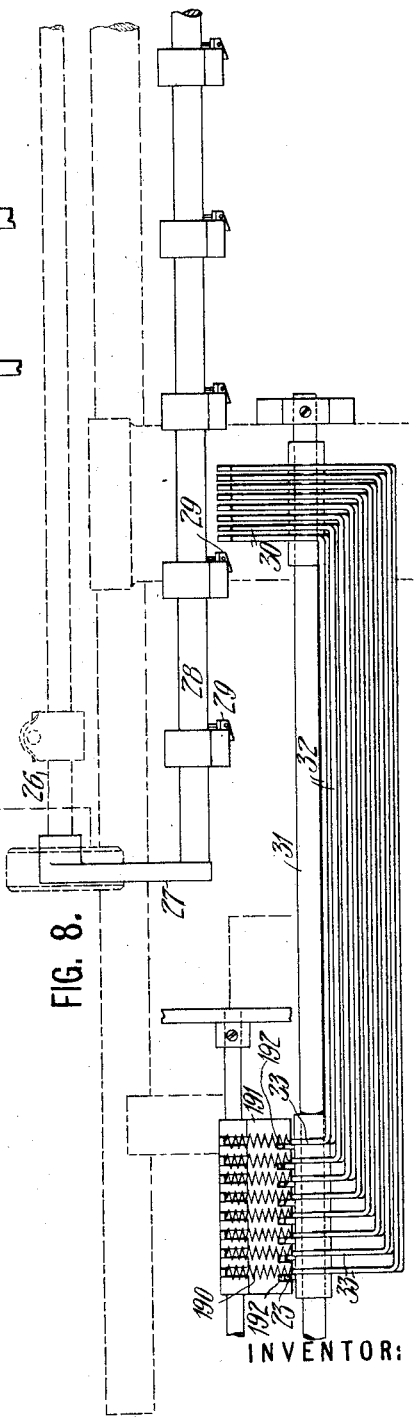
INVENTOR:
Burnham C. Stickney
WITNESSES:

B. C. STICKNEY.
COMBINED TYPE WRITING AND COMPUTING MACHINE.
APPLICATION FILED MAR. 23, 1912.
1,186,520.
Patented June 6, 1916.
9 SHEETS—SHEET 6.
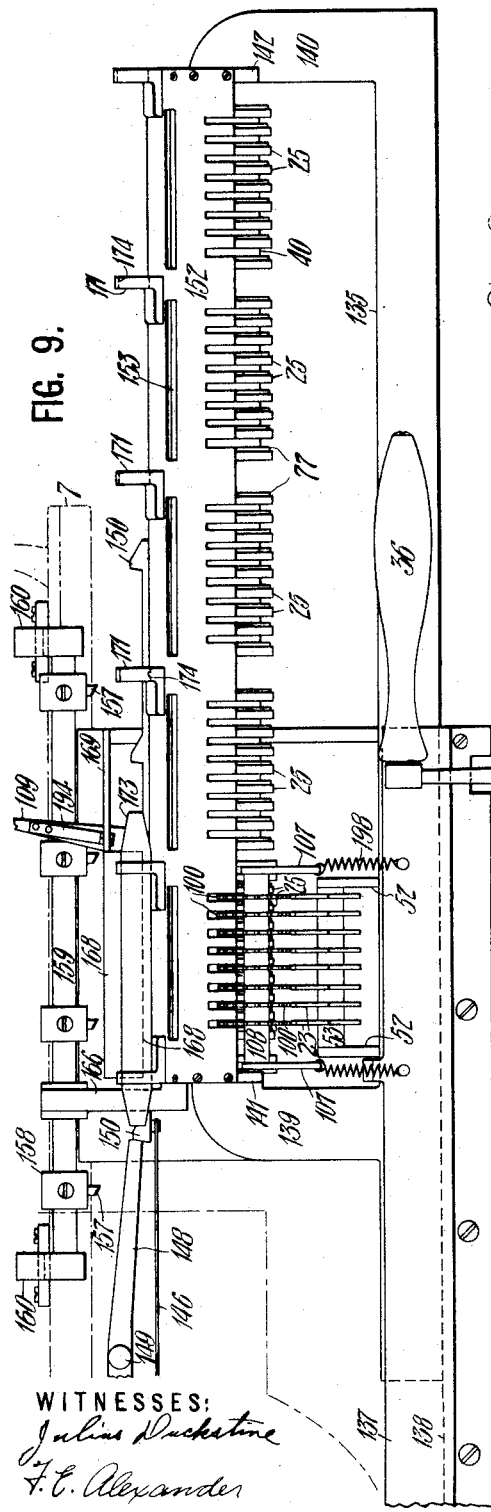
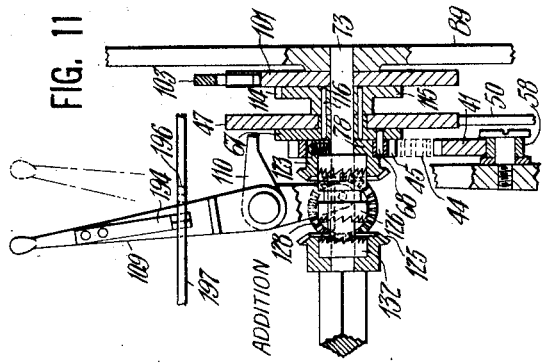
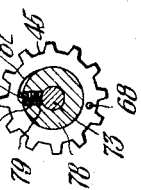
WITNESSES:
INVENTOR:
Burnham C Stickney

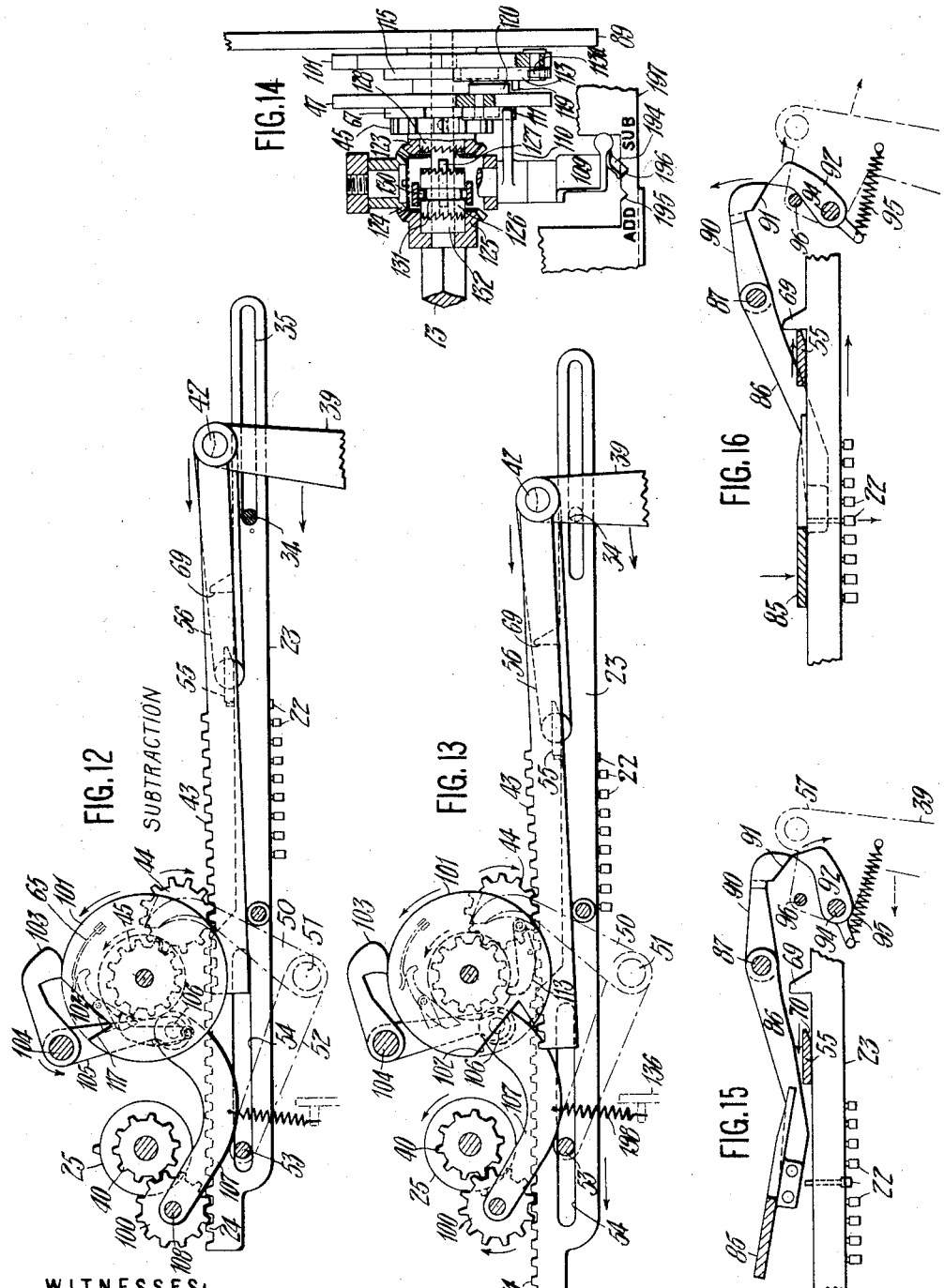

B. C. STICKNEY.
COMBINED TYPE WRITING AND COMPUTING MACHINE.
APPLICATION FILED MAR. 23, 1912.
1,186,520.
Patented June 6, 1916.
9 SHEETS—SHEET 8.
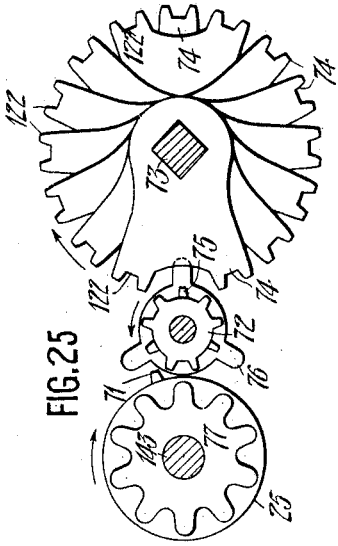
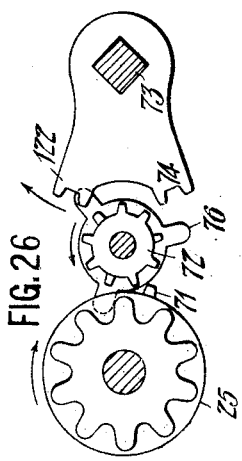
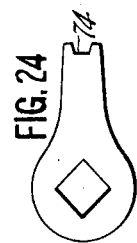
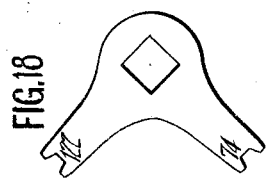
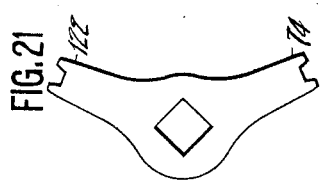
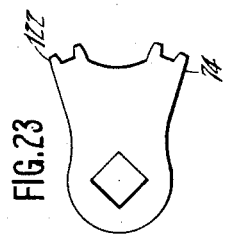
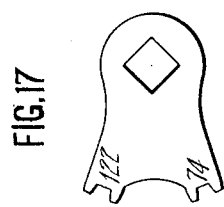
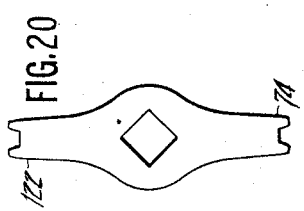
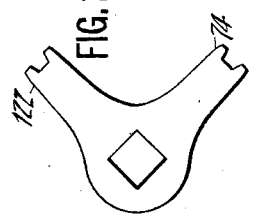
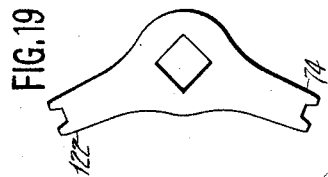
WITNESSES:
INVENTOR:
Burnham C. Stickney B. C. STICKNEY.
COMBINED TYPE WRITING AND COMPUTING MACHINE.
APPLICATION FILED MAR. 23, 1912.
1,186,520.
Patented June 6, 1916.
9 SHEETS—SHEET 9.
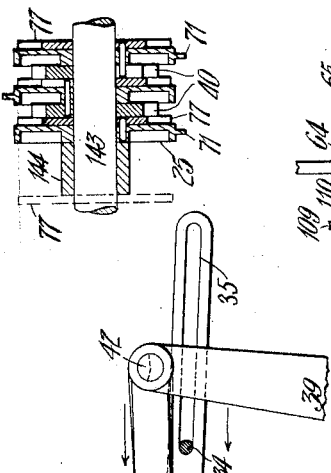
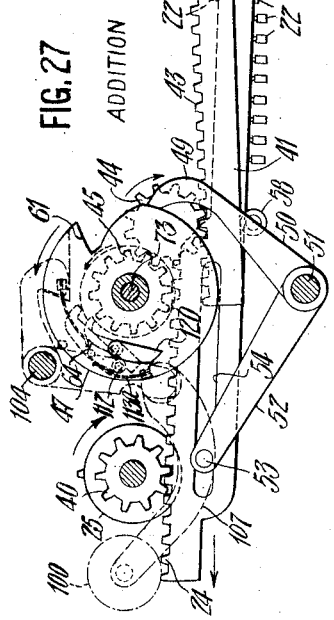

UNITED STATES PATENT OFFICE.

BURNHAM C. STICKNEY, OF ELIZABETH, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,186,520.   Specification of Letters Patent.   Patented June 6, 1916.

Application filed March 23, 1912. Serial No. 685,652.

*To all whom it may concern:*

Be it known that I, BURNHAM C. STICKNEY, a citizen of the United States, residing in Elizabeth, in the county of Union and State of New Jersey, have invented certain new and useful Improvements in Combined Type-Writing and Computing Machines, of which the following is a specification.

This invention relates principally to combined typewriting and computing machines of the class in which numeral keys are caused to set up computation pins, a general operator being subsequently employed to rotate dial wheels simultaneously to various extents determined by the said pins. A machine of this type is disclosed in the pending application of Frederick A. Hart, No. 466,836, filed December 10, 1908. In said machine the principal members of the computing mechanism are placed in a casing and a typewriting machine is mounted upon said casing.

One of the objects of my improvements is to avoid the necessity of elevating the typewriting machine to the extent heretofore practised in such machines, so that the keyboard will occupy about the same position with reference to the table on which the typewriter stands, as is the case with an ordinary typewriter having no computing attachment. To this end I mount the dial wheels at the front of the typewriter just over the keyboard, and the racks which operate the wheels extend backwardly alongside of the typewriter. The general operator is of simple structure and mounted beneath the racks. The dial wheels are hence placed where they are easily read, and the racks are compactly mounted and easily accessible, while the general operator handle is in a convenient position for manipulation; and the cost of manufacture of the computing attachment is greatly reduced.

The denomination selecting mechanism is very much simplified and reduced in cost, owing to the proximity of the pin-carrying racks to the typewriter carriage which selects the racks upon which the pins are to be set.

In the Underwood-Hanson combined typewriting and computing machine which is illustrated in said Hart application, when it is desired to employ two or more sets of computing wheels, it is also necessary to provide a separate set of wheel-operating racks and connections to the typewriter carriage for each set of dial wheels. According to the present improvements, several sets of dial wheels may be arranged along the front of the typewriter and placed upon a carriage which may be adjusted from time to time to coöperate with the wheel-driving racks aforesaid, so that several sets of computing wheels may be very inexpensively, compactly and conveniently arranged upon the machine to be driven by a single set of pins. The invention also includes improved means for effecting subtraction whenever desired upon any of the computing wheels mounted on said carriage.

The movements of the computer carriage are preferably taken care of automatically, so that when writing and adding several columns on a page simultaneously, the number set up by the computation pins is carried into the computing wheels, and the computer carriage is advanced to bring the next set of computing wheels into play before beginning the writing of the next number on the line on the work sheet. Upon returning the typewriter carriage, the computer carriage is also automatically returned, so that a new line of writing and computation may be begun.

The denomination selecting mechanism includes a novel denomination transposing device which is applicable to other machines also.

Other features and advantages will hereinafter appear.

Figure 2:
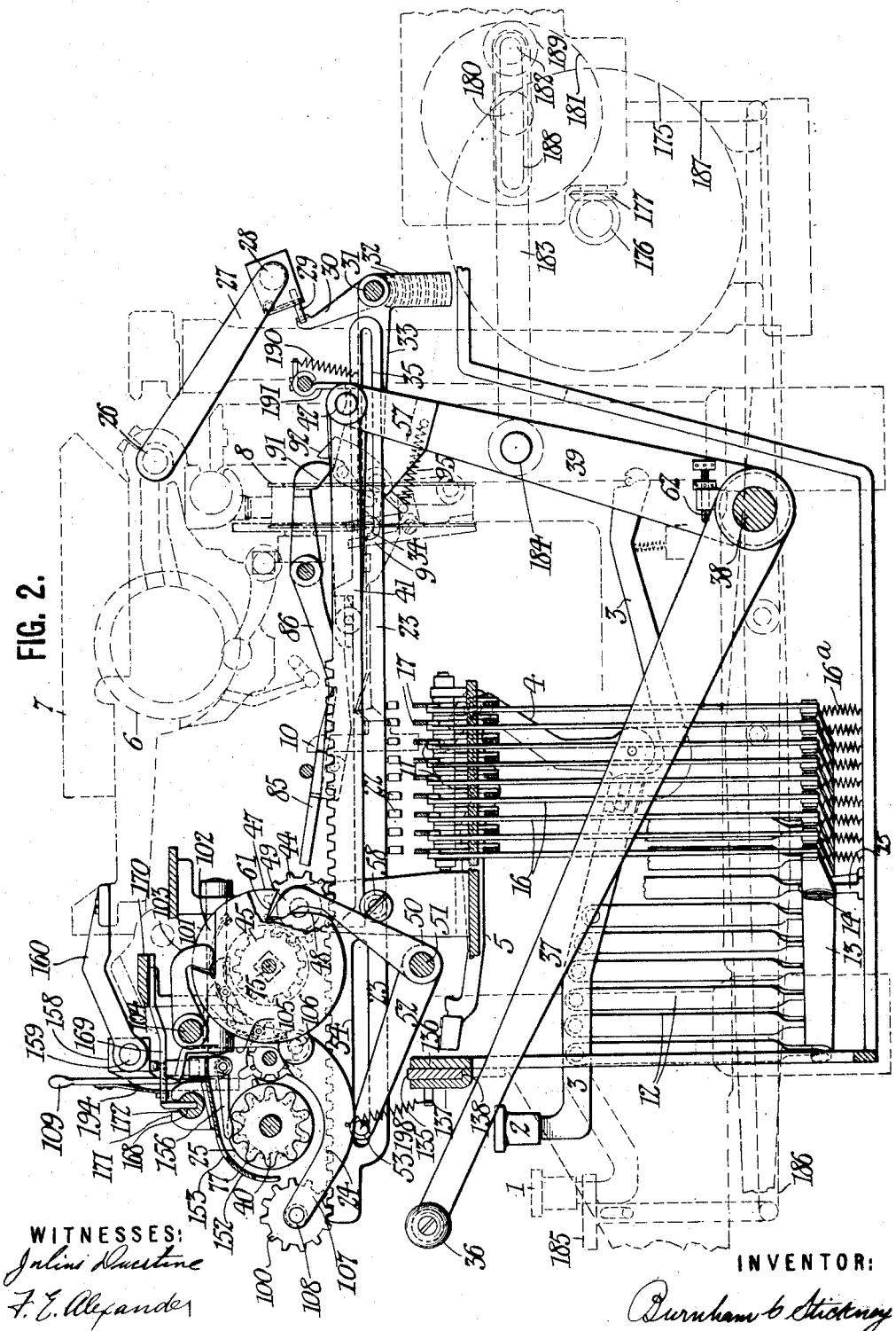
Figure 3:
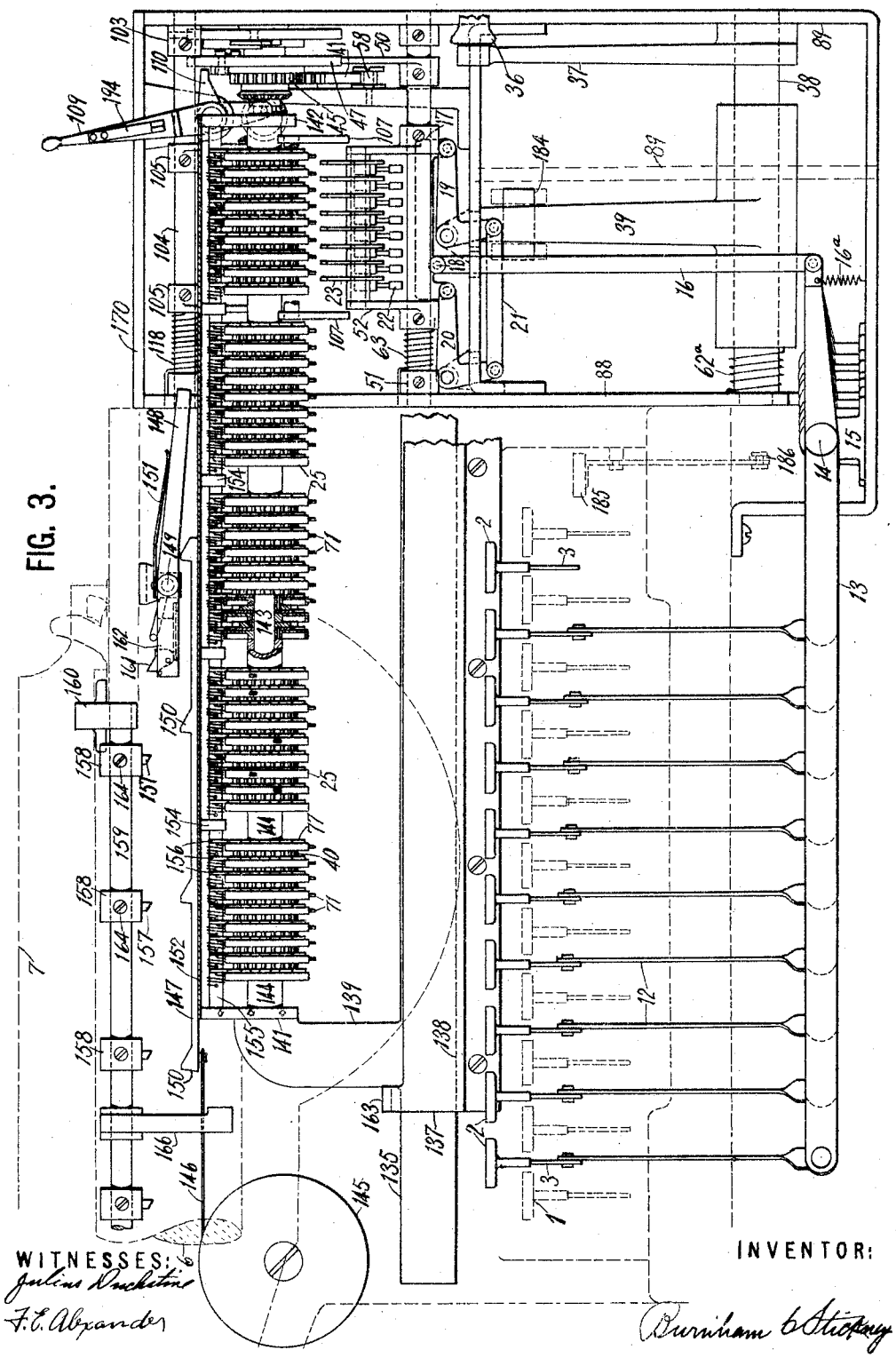

In the accompanying drawings, Figure 1 is a perspective front view of the computing mechanism applied to an Underwood front strike typewriting machine. Fig. 2 is a part sectional side elevation of the typewriting and computing mechanism, showing the parts in normal positions. Fig. 3 is a front elevation of the machine. Fig. 4 is a plan of the computing devices, showing their relation to the typewriting machine. Fig. 5 is a part sectional plan of the key-driven computing lever, etc. Fig. 6 is a sectional front elevation of the key-driven linkage to illustrate the manner of setting a computation pin. Fig. 7 is a view similar to Fig. 6, but showing the key-driven linkage as elevated to set the pin. Fig. 8 is a rear elevation of the denomination selecting and transposing mechanism. Fig. 9 is a front elevation, showing the computer carriage returned to the right for the beginning of a new line of computation. Fig. 10 is a sectional elevation of the clutch forming part of the general operator of the computing mechanism. Fig. 11 is a sectional front elevation illustrating the handle which may be shifted to set the machine for either addition or subtraction, and the parts controlled by said handle. In Figs. 12 to 14 the parts are set for subtraction. Fig. 12 shows the general operator as having begun its stroke and shifted the dial wheel drivers into position for effecting subtraction. Fig. 13 corresponds to Fig. 12, but shows the parts as having advanced beyond the Fig. 12 position. Fig. 14 is a sectional plan of the parts seen at Fig. 11. Fig. 15 is a sectional side elevation to illustrate the normal position of the plate which returns to normal positions the key-set pins. Fig. 16 shows how said plate depresses the pins. Figs. 17 to 24 are diagrammatic views of duplex spurs for rotating the carry-over trains in opposite directions. Fig. 25 is a sectional elevation to show a dial wheel, a computing train and a double set of spurs for driving the carry-over trains; the movements of the parts for addition being shown by arrows. This figure shows the normal positions of the parts. Fig. 26 is similar to Fig. 25, but shows the carry-over train as having been started by a tooth on the dial wheel. Fig. 27, 28 and 29 correspond to Figs. 12 and 13, but show the machine set for addition. Fig. 27 shows the general operator as having lifted the racks into mesh with the computation pinions. Fig. 28 shows the positions of the parts at the completion of the forward stroke of the general operator. Fig. 29 shows the normal positions of the parts. Fig. 30 is a sectional view of parts of some dial wheels and their appurtenances. Fig. 31 is a sectional elevation of certain portions of the mechanism whereby the general operator moves the drivers into mesh with the computation pinions for either addition or subtraction.

Alphabet keys 1 and numeral keys 2 depress levers 3, to rock bell cranks 4, which swing type bars 5 to print upon a platen 6. The platen is mounted upon a carriage 7, which, as usual in the Underwood typewriting machine, is driven by a spring barrel 8. The step-by-step or letter-feeding movement of the carriage is controlled by dogs 9, which are operated by a universal bar 10, actuated by heels 11 on the type bars.

The numeral key-levers have pendent links 12, pivoted at their lower ends to levers 13 of the first order, fulcrumed at 14 upon fixed brackets 15. These levers extend toward the right of the keyboard, Fig. 5, and at their outer ends are pivoted to the bottom ends of upstanding links 16, to thrust the latter up as the keys descend. The links 16 may have returning springs 16ª, and may be in a row parallel with the key levers at Fig. 5, and the levers 13 may be of assorted lengths; and the links 12 may be disposed in a diagonal row so as to give clearance; while the fulcrums 14 may be so placed that the thrust links 16 are given equal movements. It is obviously not essential to place the levers 13 diagonally; and it is also apparent that keys may be otherwise connected to links 16. These links 16 are connected at their upper ends with a set or nest of linkages intended to set up the computation pins. Each linkage comprises a horizontal pin-setting bar 17, to which the upper end of its link 16 is pivoted at 18, Fig. 6. This horizontal bar or link 17 is pivoted at its ends upon a pair of bell cranks 19, 20, which are connected by a link 21, so that said link 17 is given a parallel movement up and down. When one of these links 17 is thrust up, it sets one of its computation pins 22 in the manner indicated at Fig. 7.

The computation pins are arranged in eight rows of nine pins each, one row being mounted upon each bar 23. The nine bars carry at their forward ends racks 24, for communicating movement to nine dial wheels 25, arranged at the front of the machine about in a level with the typewriter carriage, where they may be easily read.

It will be seen that these computation racks or bars 23 are compactly mounted at one side of the frame of the typewriting machine, preferably at the right-hand side, and that the links 16, as well as the pin-setting linkages, are all compactly placed under the rack bars 23, and connected by simple devices to the keys; whereby great economy of room is effected, and the necessity of unduly elevating the keyboard of the machine is avoided. When the computation racks 23 are in normal positions, they are out of reach of the pin-setting linkages 17; and provision is made whereby the typewriter carriage 7 depresses the computing racks or bars *seriatim*, so that the linkages may set the pins thereon.

From a rod 26, fixed or mounted on the carriage, extends rearwardly a pair of arms 27, carrying a rack 28, along which are independently adjustable several dogs 29, in position to engage, one after another, a series of rock-arms 30, which are loosely mounted upon a fixed shaft 31, and each connected by an integral bail 32 to a forwardly-extending arm 33, the latter having at its forward end a pin 34, engaging a horizontal slot 35 in a computation bar 23; the slot permitting the pin to raise or lower the rear end of the bar, without interfering with the longitudinal movement thereof which occurs at the operation of turning the computing wheels. The dog 29 may vibrate any arm 30 and bail 32, together with that arm 33 which is preferably integral with the bail 32 and arm 30, so that the pin-carrying bar is swung down to enable any of the linkages 17 to thrust up the overlying pin, see Figs. 6 and 7.

It will be seen at Fig. 8, which is a rear elevation, that the denominational order of the arms 30 is the reverse of the denominational order of the arms 33, all the bails being nested one within another as shown, to form a denomination-transposing device, so that while the operation of the arms 30 proceeds toward the right at Fig. 8, the operation of the arms 33 proceeds toward the left, at said figure, so that as the carriage proceeds in letter-feeding direction, the computation bars 23 will be depressed in the proper order beginning with the highest denomination, since it is the arm 30 of highest denomination which is first rocked by the carriage-dog 29.

From the foregoing, it will be seen that at the completion of a letter-feeding movement of the typewriter carriage, one of the pin-carrying rack bars is depressed, and that at the ensuing stroke of a numeral key a computation pin is lifted upon said rack or bar, so that said pin will project above its fellows when the bar is returned to its normal elevated position. In this manner, the pins are set up one after another, as the number is written upon the work sheet which is carried upon the platen. At the completion of the writing of the number, the operative pulls forwardly a handle 36 on an arm 37 which extends from a rock shaft 38. The latter also carries an upstanding arm 39, which forms part of the general operator of the computing mechanism, and the principal function of which is to rotate the dial wheels 25 as determined by the computation pins which have been set up by the keys 2. At the initial part of the forward stroke of the general operator 39, the computation racks 24 (when performing addition) are shifted up into mesh with pinions 40 fixed one to each of the dial wheels 25. It will be seen that the racks 24 preferably stand normally well below the dial wheels 25, to permit the latter to travel with the computing carriage upon which they are mounted, as will presently be explained. This shifting of the racks 24 up into mesh with the pinions, is effected through the instrumentality of a horizontal driver 41, pivoted at its rear end, a rock shaft 42, to which is also pivoted the upper end of arm 39, and extending forwardly and carrying on its forward end a rack 43, which meshes with an idle pinion 44, the latter meshing with a pinion 45 on a shaft 73, which carries a rack-controlling disk 47, provided with a cam 48. This cam forms one side of a notch cut in said disk. This notch is normally occupied by a finger 49, carried upon an arm 50, which extends up from a rock shaft 51 mounted in the framework of the machine. Forwardly from said rock shaft 51 extend two arms 52, united by a shifter bar 53, which passes through horizontal slots 54 in all the racks 24, whereby said bar 53 may shift the racks up into mesh with the computation pinions 40, and down to normal position.

Sufficient rotation of the disk 47 is effected to cam the finger 49 out of the notch 48, and thereby lift the racks 24, before the latter advance longitudinally. The positions of the parts at this moment are seen at Fig. 27. The racks 24 are now in mesh with the computation pinions 40, in which position they are held or locked by reason of the engagement of finger 49 with the cylindrical or unmutilated periphery of the disk 47. A horizontal cross-bar 55, forming part of the general operator, now advances to engage all of the computation pins 22 which have been set up by the keys 2, and to advance the computation racks accordingly during the remainder of the forward stroke of the general operator arm 39; whereby the pinions 40 and dial wheels 25 are rotated accordingly, to add upon the dial wheels the number which has just been written upon the work sheet.

The rack-advancing bar 55 is carried by a pair of arms 56, seen in plan at Fig. 4, which are fixed upon a rock shaft 42, carried in a fork 57 formed upon the upper end of the general-operator arm 39, Fig. 1; the driving bar or rack 41 aforesaid being loose on said rock shaft, and normally supported at its forward end on a guide roll 58 which is placed directly beneath pinion 44, Fig. 2. The rack-advancing bar 55 may rest directly upon the racks, and may be swiveled at 59 to its driving arms 56, to accommodate itself to the slight inclination of the rack bars as they rise into mesh with their pinions. A spring 60 may be provided upon the rock-shaft 42, to hold the bar 55 lightly down upon the racks.

The dial wheels 25 having thus been rotated, and the general operator having completed or substantially completed its forward stroke, the racks 24 are dropped out of mesh with the pinions, preparatory to beginning their return strokes to normal positions. This unmeshing is caused by the rack-controlling finger 49 falling again into the notch in the cam disk 47; the other wall of said notch being designated as 61, and being abrupt (preferably concentric with rock shaft 51), so that the racks may drop promptly on the completion of the rotation of the notched disk 47 through a single revolution. It will be understood that the handle 36 is pulled down by the operative until it is arrested by an adjustable stop 62, after the racks 24 have dropped; and that thereupon the operative lifts said handle and returns the general operator to normal position, ready for another computation. During such return stroke, the racks 24 ride backwardly upon the guides 34, 53, without turning any wheels. A spring 62ª may either effect or assist the return of the general operator.

During the return stroke of the general operator, the cam disk 47 remains stationary, being held against rotation by the finger 49 which occupies the notch and serves as a detent; a spring 63 (Fig. 3), coiled around the rock shaft 51, aiding the weight of the racks in maintaining said finger 49 against displacement. The pinion 45, however, is also employed for driving the tens-carrying trains; and for this purpose it makes a single revolution in reverse direction during the return stroke of the general operator. To permit this return stroke while cam disk 47 is stationary, a loose connection is provided between said pinion 45 and said disk 47; this connection comprising a pawl or clutch 64, Fig. 28, which is pressed by a spring 65 into engagement with a single shoulder 66 formed on a clutch disk 67, which is fixed to the pinion 45 preferably by a pin 68, Fig. 11. The pinion 45 may, therefore, move in return or clockwise direction at Fig. 27, independently of the cam disk 47; but when said pinion is advancing or moving counterclockwise at said figure, it gives the cam disk 47 a complete revolution in the same direction, for the purpose already explained.

The rack-advancing bar 55, during the return motion of the general operator 39, engages lugs 69 formed on the computation bars 23, and restores them to normal positions. The bar 55 may be undercut or beveled on its rear edge at 70, to enable it to ride over any pins 22 which may be accidentally set up while the general operator is in the abnormal Fig. 28 position.

Upon each of the dial wheels 25 (except the wheel of highest denomination) is a tooth 71, to start the associated tens-carrying train, which comprises a 9-tooth pinion 72 engageable by tooth 71 and rotated thereby through one-ninth of a revolution. The normal position of the tens-carrying train is seen at Fig. 25, while the position to which it is turned by tooth 71, is seen at Fig. 26. Upon a shaft 73, which carries the driving pinion 45, are placed eight spurs or segments 74, which are rotated in clockwise direction at Fig. 25 by the pinion 45 during the return stroke of the general operator. If any of the tens-carrying trains have not been started, the movements of their associated spurs will be idle, since every second tooth of the pinion 72 is cut away, as at 75, to give clearance for these driving spurs, and this clearance normally stands opposite to the spur-shaft 73, as at Fig. 25. In case, however, any pinion 72 has been started, as at Fig. 26, the ensuing movement of the associated spur 74 will rotate the pinion through two-ninths of a revolution; making one-third of a revolution in all.

To each pinion 72 is fixed a three-toothed pinion 76, to turn into mesh with and advance for one-tenth of a revolution a ten-toothed gear 77, which is fixed to the dial wheel 25 of next higher denomination, thereby carrying 1 over to the last-mentioned dial wheel. The shaft 73 is motionless during the advance stroke of the general operator, because it has a clutch connection to the pinion 45, (see Fig. 10). In a hub 78 mounted on the shaft, is a pocket 79 to receive a spring 80 and a ball 81, the latter being pressed into a recess 82 in the pinion 45; the construction being such that the pinion may turn freely in one direction for a full revolution, but during its back stroke will turn the shaft a full revolution. A notched disk 83 is provided upon the spur-shaft 73, a spring detent 84 normally occupying the notch to hold the shaft and the spurs thereon in normal positions.

It will thus be seen that during the return stroke of the general operator, the carry-over trains are operated wherever necessary; this carry-over mechanism corresponding generally with that disclosed in the application of Frederick A. Hart, No. 466,836, dated December 10, 1908. During the final portion of the return stroke of the general operator, the computation pins 22 which were originally projected, are restored to normal positions by means of a plate 85, overlying the pins and fixed upon a pair of arms 86, which extend forwardly from a rock shaft 87 journaled in the side plates 88, 89, of the framework, and extending between the same, said plates being fixed to the main frame of the typewriting machine at one side thereof. Rearwardly from said rock shaft extends an arm 90, having at its rear end a bevel 91, which is engaged by a cam or tappet 92 on the fork 57 of the general operator arm 39; whereby the arm 90 is cammed up, and the plate 85 is swung down to depress all of the projected pins 22 to their normal positions. The cam or tappet 92 finally escapes from the cam 91, Fig. 16, and a spring 93, Fig. 4, lifts the pin-restoring plate 85 to normal position, as at Fig. 2. During the forward stroke of the general operator, the tappet 92 (Fig. 15) passes freely by the cam 91, the former being pivoted at 94 to the general operator arm, to permit it to yield. A spring 95 thereupon restores the tappet 92 to normal position, resting against a stop 96 on the general operator arm.

At the subtraction operation, Figs. 12, 13, the computation racks 24 are not shifted up; the cam disk 47, which controls the elevation of said racks, remaining stationary. The racks are connected to the computation pinions 40 for subtraction purposes by means of floating or idle pinions 100, which are automatically shifted forwardly from their idle positions at Fig. 27 to the Fig. 12 position in mesh with said pinions 40. This shifting of the subtraction pinions 100 is effected by a disk 101, having a cam notch 102 normally occupied by a finger 103, fixed upon a rock shaft 104, the latter also carrying a pair of arms 105 which are pivoted at 106 to a pair of forwardly extending links 107, which carry at their front ends a cross-shaft 108 upon which all the subtraction pinions 100 are loosely mounted. During the initial part of the forward stroke of the general operator to the Fig. 12 position, before the racks 24 start forward, the cam 102 raises the finger 103, rocks the shaft 104 and arm 105, and draws rearwardly the links 107 together with the pinions 100, the latter running idly upon the racks 24 and meshing with the pinions 40. During the remainder of the forward motion of the general operator, the dial wheels 25 will be rotated reversely, so as to subtract the amounts represented by the pins 22 that have been set up by the keys. A controlling handle or device 109, seen at Fig. 3 in addition position, may be swung to the right, to the position seen in dotted lines at Fig. 11 and in full lines at Fig. 14, to set the machine for effecting subtraction. Rigid with this handle or lever 109 is an arm or shoulder 110, which stands in idle position when the machine is adding, but which may be swung down, as at Fig. 31, to strike an arm 111 on the pawl 64 to release the same, so that the clutch disk 67 may revolve idly or without stirring the addition cam disk 47.

Upon the subtraction cam disk 101 there is pivoted at 112 a pawl 113, to engage a shoulder 114 on a clutch disk 115, which is positively connected to the pinion 45 by pins 116, Fig. 11. By this means the cam disk 101 is given an entire revolution during the forward stroke of the general operator at the subtraction operation, to bring the subtraction pinions 100 into use and hold them in their effective positions during the advance of the computation racks 24. At the conclusion of the revolution of the cam disk 101, the finger 103 snaps into the notch 102 in disk 101, and engages the abrupt wall 117 thereof, this movement being effected by a spring 118, whereby the pinions 100 are returned to their normal position, Fig. 27. The computation racks 24 may now, of course, be returned freely to normal positions without rotating the dial wheels 25.

It will be understood that the two cam disks 47 and 101 do not rotate simultaneously; or in other words, when either one is in use, the other one stands idle. It has already been explained that when the machine is set for subtraction, the shoulder 110 releases the clutch pawl 64 of the addition cam disk 47. When the machine is set for addition, however, the pawl 64 is active, but the subtraction pawl 113 is released, owing to the engagement of a pin 119 thereon by a tail 120 on the addition pawl 64, see Fig. 28; said tail having a cam edge 121 to engage said pin 119, and release the subtraction pawl 113 at each completion of the rotation of addition disk 47. Thus, though the two clutch disks 67 and 115 always rotate together at the forward stroke of the general operator, still only one of the cam disks (47 or 101) is in use at any time.

During the advance of the general operator, the clutch disk 115, Fig. 31, rotates to the left and drives the cam disk 101 accordingly for a full revolution; but during the return stroke of the disk 115, the cam disk 101 is stationary, and the pawl 113 rides idly upon the edge of the disk and finally snaps behind the shoulder 114 thereon, due to the pressure of a spring 113$^a$ associated with it. A similar operation takes place with respect to pawl 64 and clutch disk 67, when the machine is set for addition.

During the reverse rotation of the dial wheels 25 when subtracting, the starting teeth 71 thereon, may start the respective carry-over pinions 76 in the reverse direction from that shown by the arrow at Fig. 25; and during the ensuing return stroke of the general operator, the set of subtraction spurs 122, Fig. 25, is brought into action, to complete the rotation of the tens-carrying trains in reverse direction, so that each may make a full third of a revolution and thereby turn the next higher computing wheel 25 reversely a single point, or in other words, borrow 10 from said higher computing wheel.

The spurs 122 may be upon the same shaft 73 as the spurs 74, and the latter may rotate idly during the operation of borrowing tens. Both the addition spurs 74 and the subtraction spurs 122 are placed spirally along the shaft 73, so that the spurs in either set will act one after another upon the tens-carrying trains, as set forth in my application No. 658,958, filed November 7, 1911.

The shifting of the handle 109 from the addition position at Fig. 3 to the subtraction position at Fig. 14, has the effect of reversing the connection between the general driving pinion 45 and the spur shaft 73, so that the latter rotates reversely when actuated by the pinion 45 at the return stroke of the general operator. The shaft-reversing mechanism comprises bevel pinions 123, 124, 125, forming a train, the pinions 123 and 125 being loose on the shaft 73, and connected by 124. The hub 78 (seen at Fig. 10) is formed upon the pinion 123, so that said pinion may always be revolved in the same direction during the return stroke of the pinion 45. At Fig. 11, a double-headed clutch member 126, which is splined at 127 to said shaft 73, is shown clutched to the pinion 123, the latter having an internal clutch-member or ratchet 128, to match one end of the double clutch member 126, so that the shaft 73 is turned positively in the direction for addition, or clockwise at Fig. 25. When said handle 109, (which has pins 130 to engage a groove 131 in said double-headed clutch 126) is swung to the subtraction position at Fig. 14, the other clutch head on said double clutch engages an internal ratchet 132, formed on the pinion 125, so that the latter drives the double clutch, and hence the shaft 73, in the reverse direction.

Many of the parts so far described, are mounted on shafts or arbors which are supported in the side plates 88, 89 of the fixed computing frame. If desired, the lower part of the plate 89 may be set inwardly for compactness, as seen in dotted lines at Fig. 3, and in full lines at Fig. 1.

The mechanism so far described relates to a single computing head. One of the features of the invention, however, is the provision of a simple and efficient mechanism for computing upon any of a plurality of computing heads. This is one reason why the computing racks 24 are placed at the upper part of the machine, where the computing wheels 25 may be in position for convenient actuation by said racks, and at the same time may be placed upon a special carriage which may be simply connected to the carriage of the typewriter, or readily caused to coöperate therewith. The five sets of computing wheels illustrated, (more or less than five may be used), are shown placed upon such separate carriage, which may consist of a horizontal bar 135, arranged in front of the typewriting machine at the back of the keyboard, and supported in a guide groove formed by a back plate or rail 136 and front plate or rail 137, the latter bent under the carriage bar 135, Fig. 2, to form a rail or track for supporting the same, as at 138. From the said bar 135 rise arms 139, 140, the upper ends of which are bent forwardly to form ears 141, 142, which are rigidly connected by a long horizontal tie-rod 143, which forms an arbor for all of the dial wheels; the latter being divided into heads, which are separated by washers or collars 144 placed on the arbor 143. This computing carriage 135 may slide in the same direction as the typewriter carriage, and for nearly the same length of travel. It will be seen at Fig. 2 that the dial wheels and other portions of the carriage are clear of the computation racks, the carry-over trains, and the subtraction pinions; so that said computing carriage may be adjusted freely along its track; while only one set of operating racks, carry-over trains, and subtraction pinions, with their appurtenances, needs to be provided; all of these being mounted upon the machine frame in position to act upon any computing head that may be presented thereto.

It will be understood, of course, that the computer carriage remains stationary during the writing of all the digits of a number, that is, during a limited portion of the travel of the typewriter carriage; and for this reason, the two carriages are not positively connected. The movements of the computer carriage are preferably automatic, and for this reason said carriage may be driven by a spring, as for instance that contained in a barrel 145 pivoted upon the framework of the typewriter, and connected by a strap 146 to a bar or rack 147 that is fixed to the computer carriage.

The computer carriage is normally held against advancing by a feed-pawl or dog 148, pivoted at 149 upon the machine framing, to engage any of a series of teeth 150 formed on the rack or bar 147, at intervals to agree with the intervals between corresponding dial wheels of successive computing heads; said pawls being pressed down by a spring 151. This rack is fixed upon a cover plate 152, which extends from end to end of the computer carriage, and overhangs the computation wheels, being provided with sight openings 153.

The cover plate is supported between its ends by lugs 154, which project up from a tie-rod 155, extending from ear 141 to ear 142 of the computer carriage. Upon this tie-rod may also be pivoted spring detents 156 for the dial wheel gears 77.

Whenever the typewriter carriage has moved out of one computing zone, and before it moves into another, the detent dog 148 is tripped by means of one of a series of tappets 157 depending from collars 158 adjustably mounted upon a rod 159, the latter secured at its ends in lugs 160 fastened to the front of the typewriter carriage. Any of these tappets 157 may engage a cam 161 on an arm 162 provided on said detent dog 148, and by depressing said cam, may lift said dog 148 from the tooth 150 engaged thereby, and thereby release the computer carriage, so that it may be drawn rapidly to the left by the spring 145, until arrested by engagement of the succeeding tooth 150 by said dog 148, which is quickly snapped down by the spring 151; the movement of said cam 161 by the tappet 157, and the escape of the latter, both preferably occurring during a single letter-feeding movement of the typewriter carriage, so that the action of dog 148 may be prompt in resuming normal position and engaging the succeeding tooth 150. The last feeding movement of the computer carriage is arrested by the engagement of arm 139 with a stop 163 provided upon the left-hand end of rail 137, Fig. 3. The tappet collars 158 are adjustably secured along the rod 139 by means of screws 164, so that the timing of their action may be made accurate; and the same is true of dogs 29.

It will be seen that a line of numbers may be written across the machine, and each number may be carried into the corresponding computing head, (being either added or subtracted from the number previously shown on said computing head), the movements of the computer carriage being automatic.

Upon the return of the typewriter carriage to normal position by means of the usual line-space lever 165, Fig. 1, an arm 166, also fixed on the carriage rod 159, engages the ear 141 of the computer carriage, and drives the latter toward the right at Fig. 3 back to initial position, for beginning the writing and computation of a new line.

The arm 166 may project forwardly to clear the strap 146 and the dog 148, and may engage the forward part of the ear 141 of the computer carriage. The typewriter carriage will return the computer carriage to the position at Fig. 9, so that said dog 148 may engage the first tooth 150 on the rack. Thus all of the movements of the computer carriage may be effected without special attention on the part of the typist; and the several computations will automatically be performed upon the appropriate computing heads. Provision may also be made for supporting or guiding the computer carriage at its upper portion, this device being in the nature of a horizontal guide rod 167, which is fixed to a turned-down forward ledge 168 formed on a plate 169, which is secured to a fixed bar 170 forming part of the front framework of the typewriter. This guiding rod is of a length to span the distance between any two guide ears 171 erected upon the computer carriage at the same intervals as the computer heads, each guide ear having a slot 172 in its top, so as to clear the bent-down ledge or flange 168. Each end of the guide rod may be pointed as at 173, to facilitate the introduction thereof into the cylindrical guide openings 174 on the ears 171. The guide rod 167 is preferably placed adjacent or directly above the dial wheels, so as to support the computer carriage directly at the point where the same is subjected to stress at the operation of turning said wheels.

If it is desired to use electric or other power for operating the computing mechanism, a motor 175 may be mounted behind the typewriter, and a bevel pinion 176 on the motor shaft may mesh with a pinion 177 connected to a worm 178; the latter meshing with a worm wheel 179 on a shaft 180; a driving disk 181 being fixed on shaft 180 and having a wrist or pivotal connection 182, to which the rear end of a link 183 is attached; the forward end of the link being pivoted at 184 to the arm 39 of the general operator. The motor, worm and gear may be substantially in accordance with the devices shown in the application of Frederick A. Hart, No. 596,451, filed December 9, 1910; and, as also shown in the same application, a key 185 may be employed for causing the worm gear to become clutched to the disk 181, or to the shaft 180, so as to give the latter a single revolution; said key being connected to a lever 186, having at its rear end a clutch-closer 187 of the kind substantially set forth in said Hart application No. 596,451.

In order to permit the handle 36 to be used when desired, the driving disk 181 may have a diametrical slot 188, and the wrist 182, whereby link 183 is connected to said disk 181, may ride freely to and fro in said slot; but when it is desired to use the motor, a screw 189 may be tightened to fasten the wrist firmly to the disk 181 in the Fig. 2 position, so that the disk may reciprocate the general operator. Either this form or any other form of driving mechanism for the general operator may be conveniently mounted behind the typewriting machine, thus making a compact structure, and avoiding the necessity of placing bulky parts beneath the typewriting machine, and perhaps necessitating the elevation of the typewriting machine too far above the work table.

It will be noticed at Figs. 2 and 8 that returning springs 190 are provided for the denomination selecting arms 33; and that a stop plate 191 is arranged above said arms to limit their return movements; said plate having guide slots or notches 192 for the rear ends of the racks 23. The handle 109, which sets the machine for either addition or subtraction, is provided with a spring detent 194, Figs. 3 and 14, which engages either of two notches 195, 196 in a fixed plate 197, to hold the handle 109 in either position. A spring 198, Figs. 12 and 13, pulls down the arms 107 to hold the subtraction pinions 100 in mesh with the driving racks 24.

Variations may be resorted to within the scope of the invention, and portions of the improvements may be used without others.

Having thus described my invention, I claim:

1. The combination with a typewriting machine having a keyboard at its front, and a carriage in rear of the keyboard, said keyboard including numeral keys, of computing devices at one side of the typewriting machine adjacent to the typewriter carriage and having denominational members controlled by said carriage, said computing devices including a system of pins, a system of computing wheels, and a general operator for driving the wheels each to an extent determined by said pins, means for setting the pins, and connections from said keys to said pin-setting means.

2. The combination with a typewriting machine having a keyboard at its front, and a carriage in rear of the keyboard, said keyboard including numeral keys, of computing devices at one side of the typewriting machine adjacent to the typewriter carriage and having denominational members controlled by said carriage, said computing devices including a system of pins, a system of computing wheels, a general operator for driving the wheels each to an extent determined by said pins, numeral key levers, links pendent therefrom, sub-levers to which said links are pivoted at their lower ends, upstanding thrust links connected to the opposite ends of said sub-levers from said pendent links, and pin-setting devices connected to said thrust links at their upper ends.

3. The combination with a typewriting machine having a keyboard at its front, and a carriage in rear of the keyboard, said keyboard including numeral keys, of computing devices at one side of the typewriting machine adjacent to the typewriter carriage and having denominational members controlled by said carriage, said computing devices including a system of pins, a system of computing wheels, and a general operator for driving the wheels each to an extent determined by said pins, numeral key levers, links pendent therefrom, sub-levers to which said links are pivoted at their lower ends, upstanding thrust links connected to the opposite ends of said sub-levers from said pendent links, and pin-setting devices connected to said thrust links at their upper ends, said thrust links forming a row parallel with the key levers, and said sub-levers being of assorted lengths, said pendent links disposed in a diagonal row, and the fulcrums of said sub-levers being so placed that the thrust links are given equal movements.

4. The combination with a typewriting machine having a keyboard at its front, and a carriage in rear of the keyboard, said keyboard including numeral keys, of computing devices at one side of the typewriting machine adjacent to the typewriter carriage and having denominational members controlled by said carriage, said computing devices including a system of pins, a system of computing wheels, and a general operator for driving the wheels each at an extent determined by said pins, numeral key levers, links pendent therefrom, sub-levers to which said links are pivoted at their lower ends, upstanding thrust links connected to the opposite ends of said sub-levers from said pendent links, and pin-setting linkages operated by said thrust-links and including each a horizontal bar to which the upper end of the corresponding thrust-link is pivoted, said thrust links forming a row parallel with the key levers, and said sub-levers being of assorted lengths, said pendent links disposed in a diagonal row, the fulcrums of said sub-levers being so placed that the thrust links are given equal movements.

5. The combination with a typewriting machine having a keyboard at its front, and a carriage in rear of the keyboard, said keyboard including numeral keys, of computing devices at one side of the typewriting machine adjacent to the typewriter carriage and having denominational members controlled by said carriage, said computing devices including a system of pins, a system of computing wheels, and a general operator for driving the wheels each to an extent determined by said pins, numeral key levers, links pendent therefrom, sub-levers to which said links are pivoted at their lower ends, upstanding thrust links connected to the opposite ends of said sub-levers from said pendent links, and pin-setting linkages operated by said thrust-links and including each a horizontal bar to which the upper end of the corresponding thrust-link is pivoted, said linkages arranged beneath the system of pins, and arranged to thrust up any pin in the series, and a general operator having means overlying the pin bars to advance the latter to turn the computing wheels.

6. The combination with a typewriting machine having a keyboard at its front, and a carriage in rear of the keyboard, said keyboard including numeral keys, of computing devices at one side of the typewriting machine adjacent to the typewriter carriage and having denominational members controlled by said carriage and extending forwardly and rearwardly at the side of the machine, said computing devices including a system of pins carried by said denominational members, a system of computing wheels, and a general operator for driving the wheels each to an extent determined by said pins, means for setting the pins, and connections from said keys to said pin-setting means, said computing wheels being located at the front of the typewriting machine about on a level with said carriage and having means whereby they may be rotated by said denominational members.

7. The combination with a letter-feeding carriage, of a set of computing wheels or devices, a general operator for advancing said wheels, key-controlled means, including a set of denominational devices, for determining the extent to which the wheels shall be advanced by said general operator, and a denomination-transposing device extending from said denominational devices to said carriage, to enable the latter to select the denomination of the wheels to be actuated, said transposing device comprising a set of bails each having at one end means to be operated by the carriage and at the other end means connected to the denominational devices, said bails being of assorted sizes and nested one within another, whereby the transposition of the denominations is effected.

8. The combination with a typewriting machine having a keyboard at its front, and a carriage in the rear of the keyboard, said keyboard including numeral keys, of computing devices at one side of the typewriting machine adjacent to the typewriter carriage and having denominational members controlled by said carriage, said computing devices including a system of computing wheels, a system of pins, means for setting the pins, connections from said keys to said pin-setting means, and a general operator comprising an upstanding arm beneath said computing devices, means carried by said arm at its upper end for engaging the pins to drive the wheels, and an operating arm.

9. The combination with a typewriting machine having a keyboard at its front, and a carriage in rear of the keyboard, said keyboard including numeral keys, of computing devices at one side of the typewriting machine adjacent to the typewriter carriage, said computing devices including a system of computing wheels, denominational computing racks controlled by said carriage, said racks normally out of mesh with said wheels, key-set means for determining the extent of movement of said racks, and a general operator comprising an upstanding arm beneath said computing devices, means carried by said arm at its upper end for enabling the racks to drive the wheels, an operating arm, a driving rack pivoted at one end to the upper end of the first-named arm of said general operator and extending forwardly, and means meshing with said driving rack to lift said computing racks into mesh with said computing wheels.

10. The combination with a typewriting machine having a keyboard at its front, and a carriage in rear of the keyboard, said keyboard including numeral keys, of computing devices at one side of the typewriting machine adjacent to the typewriter carriage, said computing devices including a system of computing wheels, denominational computing racks controlled by said carriage, said racks normally out of mesh with said wheels, key-set means for determining the extent of movement of said racks, and a general operator comprising an upstanding arm beneath said computing devices, means carried by said arm at its upper end for enabling the racks to drive the wheels, a driving rack pivoted at one end to the upper end of the first-named arm of said general operator, an idle pinion with which said driving rack meshes, a second pinion meshing with said idle pinion, a disk rotated by the second pinion and having a cam, and means controlled by said cam to shift said computing racks into mesh with the computation wheels.

11. The combination with a typewriting machine having a keyboard at its front, and a carriage in rear of the keyboard, said keyboard including numeral keys, of computing devices at one side of the typewriting machine adjacent to the typewriter carriage, said computing devices including a system of computing wheels, denominational computing racks controlled by said carriage, said racks having slots therein and being normally out of mesh with said wheels, key-set means for determining the extent of movement of said racks, and a general operator comprising an upstanding arm beneath said computing devices, means carried by said arm at its upper end for enabling the racks to drive the wheels, a driving rack pivoted at one end to the upper end of said general operator arm and extending forwardly, an idle pinion with which said driving rack meshes, a second pinion meshing with said idle pinion, a disk rotated by the second pinion and having a notch provided with a cam edge, a finger occupying said notch, a rock shaft upon which said finger is mounted, arms extending from said rock shaft, and a bar connected to said arms and extending through the slots in said computing racks to shift the same up and down.

12. The combination with a typewriting machine having a keyboard at its front, and a carriage in rear of the keyboard, said keyboard including numeral keys, of computing devices at one side of the typewriting machine adjacent to the typewriter carriage, said computing devices including a system of computing wheels, denominational computing racks controlled by said carriage, said racks having slots therein and being normally out of mesh with said wheels, key-set means for determining the extent of movement of said racks, and a general operator comprising an upstanding arm beneath said computing devices, means carried by said arm at its upper end for enabling the racks to drive the wheels, an operating arm, a driving rack pivoted at one end to the upper end of the first named arm of said general operator arm and extending forwardly, an idle pinion with which said driving rack meshes, a second pinion meshing with said idle pinion, a disk rotated by the second pinion and having a notch provided with a cam edge, a finger occupying said notch, a rock shaft upon which said finger is mounted, arms extending from said rock shaft, and a bar connected to said arms and extending through the slots in said computing racks to shift the same up and down, and said disk also having a cylindrical periphery to lock the racks in mesh with the computing wheels.

13. The combination with a typewriting machine having a keyboard at its front, and a carriage in rear of the keyboard, said keyboard including numeral keys, of computing devices at one side of the typewriting machine adjacent to the typewriter carriage, said computing devices including a system of computing wheels, a system of pins, denominational computing racks carrying said pins and controlled by said carriage, means for setting the pins, connections from said keys to said pin-setting means, and a general operator comprising an upstanding arm beneath said computing devices, and a cross bar hinged upon said general operator to engage all of the computation pins which have been set up by the keys and thereby advance the computing racks.

14. The combination with a typewriting machine having a keyboard at its front, and a carriage in rear of the keyboard, said keyboard including numeral keys, of computing devices at one side of the typewriting machine adjacent to the typewriter carriage, said computing devices including a system of computing wheels, a system of pins, denominational computing racks carrying said pins and controlled by said carriage, means for setting the pins, connections from said keys to said pin-setting means, and a general operator comprising an upstanding arm beneath said computing devices, a cross bar to engage all of the computation pins which have been set up by the keys and thereby advance the computing racks, a pair of arms carrying said pin-engaging bar, said upstanding arm of said general operator being forked at its upper end, and a shaft carried by said fork and to which said arms are pivoted or hinged.

15. The combination with a typewriting machine having a keyboard at its front, and a carriage in rear of the keyboard, said keyboard including numeral keys, of computing devices at one side of the typewriting machine adjacent to the typewriter carriage, said computing devices including a system of computing wheels, a system of pins, denominational computing racks carrying said pins and controlled by said carriage, means for setting the pins, connections from said keys to said pin-setting means, and a general operator comprising an upstanding arm beneath said computing devices, a cross bar to engage all of the computation pins which have been set up by the keys and thereby advance the computing racks, a pair of arms carrying said pin-engaging bar, said upstanding arm of said general operator being forked at its upper end, and a shaft carried by said fork and to which said arms are pivoted or hinged; said pin-engaging bar being swiveled to its driving arms, and beveled upon its rear edge on its under side.

16. The combination, with a computer carriage, and a plurality of separate computing heads thereon, each computing head comprising a set of computing wheels, each of which is provided with a pinion; of a single set of racks, said carriage being arranged to travel relatively to said racks to bring any one of said computing heads into position to co-act therewith; and a general operator acting to initially shift said racks into mesh with the pinions of the computing head brought into such position, and to subsequently drive the meshed racks.

17. The combination, with a computer carriage, and a plurality of separate computing heads thereon, each computing head comprising a set of computing wheels, of a single set of racks, said carriage being arranged to travel relatively to said racks to bring any one of said computing heads into position to co-act therewith; a single set of carry-over trains for co-action with the computing head brought into such position, said trains being normally out of the paths of the computing heads, so as to permit the movement of said carriage; and a general operator acting to initially shift said racks into position to coöperate with the wheels of the computing head so positioned, and to subsequently drive the meshed racks, said general operator also having means for driving said carry-over trains.

18. In a computing machine, embodying computing devices, including a system of computing wheels, a system of pins, denominational members for driving said wheels controlled as to their extent of movement by said pins, and key-controlled means for setting the pins, a general operator comprising an upstanding arm beneath said computing devices, means carried by said arm at its upper end for causing the drive of said denominational members and said wheels, and an operating arm; a plate overlying said pins; and means controlled by said upstanding arms for swinging said plate down and upon the set pins to restore them to normal positions.

19. In a computing machine, embodying computing devices including a system of computing wheels, a system of pins, denominational members for driving said wheels controlled as to their extent of movement by said pins, and key-controlled means for setting the pins, a general operator comprising an upstanding arm beneath said computing devices, means carried by said arm at its upper end for causing the drive of said denominational members and the wheels, and an operating arm; a plate overlying said pins; a pair of arms on which said plate is mounted; a rock shaft upon which said arms are mounted; and a cam or tappet on said general operator to swing said arms and plate down upon the set pins to restore them to normal positions.

20. The combination of a set of computation pinions, a set of racks normally out of mesh with said pinions, a general operator for driving said racks, a set of normally idle subtraction pinions normally meshing with said racks, a finger-piece, and means connected to said finger-piece for causing said general operator, before driving the racks, either to shift said racks into mesh with said computation pinions or to shift said subtraction pinions along said racks and into mesh with said computation pinions.

21. The combination of a set of computation pinions, a set of racks normally out of mesh with said pinions, a general operator for driving said racks, a set of normally idle subtraction pinions normally meshing with said racks, a finger-piece, means connected to said finger piece for causing said general operator, before driving the racks, either to shift said racks into mesh with said computation pinions or to shift said subtraction pinions along said racks and into mesh with said computation pinions, and a set of carry-over trains and members also controlled by said finger-piece for determining whether said carry-over trains shall operate forwardly or backwardly, according as addition or subtraction is to be performed.

22. The combination of a set of computation pinions, a set of racks for operating the same either forwardly or backwardly, a general operator to drive said racks, a revoluble cam disk, means controlled by said disk for shifting said racks into mesh with said computation pinions to perform addition, a pinion driven by said general operator, a clutch device between said pinion and said disk comprising a pawl, a finger-piece having a shoulder to release said pawl, a second cam disk called into action by the movement of said finger piece, and means controlled by said second cam disk for causing subtraction to be performed by said computing pinions at the movement of said general operator.

23. The combination of a set of computation pinions, a set of racks for operating the same either forwardly or backwardly, a general operator to drive said racks, a revoluble cam disk, means controlled by said disk for shifting said racks into mesh with said computation pinions to perform addition, a pinion driven by said general operator, a clutch device between said pinion and said disk comprising a pawl, a finger-piece having a shoulder to release said pawl, a second cam disk called into action by the movement of said finger-piece, means controlled by said second cam disk for causing subtraction to be performed by said computing pinions at the movement of said general operator, and a carry-over mechanism connected to said general operator and reversible by said finger-piece.

24. The combination with a set of computation pinions, of racks normally out of mesh with said pinions, a general operator for advancing said racks, key-set means for determining the extent of rotation of said pinions, a set of normally idle subtraction pinions meshing with said racks, and shiftable means for enabling the general operator either to shift said racks into engagement with said computation pinions, or to shift said subtraction pinions along said racks into mesh with said computation pinions.

25. The combination with a set of computation pinions, of racks normally out of mesh with said pinions, a general operator for advancing said racks, key-set means for determining the extent of rotation of said pinions, a set of normally idle subtraction pinions meshing with said racks, shiftable means for enabling the general operator either to shift said racks into engagement with said computation pinions or to shift said subtraction pinions along said racks into mesh with said computation pinions, said shiftable means including a disk driven by said general operator and having a cam, a finger operated by said cam, a rock shaft for said finger, a pair of arms upon said rock shaft, a pair of links pivoted to said arms, and a cross bar carried by said links; said subtraction pinions mounted upon said cross shaft.

26. The combination with a set of computation pinions, of racks normally out of mesh with said pinions, a general operator for advancing said racks, key-set means for determining the extent of rotation of said pinions, a set of normally idle subtraction pinions meshing with said racks, shiftable means for enabling the general operator either to shift said racks into engagement with said computation pinions or to shift said subtraction pinions along said racks into mesh with said computation pinions, said shiftable means including a disk driven by said general operator and having a cam, a finger operated by said cam, a rock shaft for said finger, a pair of arms upon said rock shaft, a pair of links pivoted to said arms, and a cross bar carried by said links; said subtraction pinions loosely mounted upon said cross shaft, and said disk constructed to shift said subtraction pinions before said general operator advances.

27. The combination with a set of computation pinions, of racks normally out of mesh with said pinions, a general operator for advancing said racks, key-set means for determining the extent of rotation of said pinions, a set of normally idle subtraction pinions meshing with said racks, shiftable means for enabling the general operator during its advance stroke either to shift said racks into engagement with said computation pinions or to shift said subtraction pinions along said racks into mesh with said computation pinions, and means for automatically returning said subtraction pinions to normal positions upon the conclusion of the advance stroke of the general operator.

28. The combination with a set of computation wheels, of driving racks out of mesh with said wheels, key-set pins for determining the extent of drive of said racks, a set of pinions meshing with said racks and normally out of mesh with said computation wheels, a general operator, an addition cam disk, a subtraction cam disk, means for connecting either disk to the general operator and simultaneously disconnecting the other disk from said general operator, means controlled by one of said disks for shifting said racks into mesh with said computation wheels, means controlled by the other of said disks for shifting said pinions into mesh with said wheels, and means subsequently operated by the general operator for advancing said racks to turn said wheels either forwardly or backwardly.

29. The combination with a set of computation wheels, of driving racks normally out of mesh with said wheels, key-set pins for determining the extent of drive of said racks, a set of pinions meshing with said racks and normally out of mesh with said computation wheels, a general operator, an addition cam disk, a subtraction cam disk, means controlled by one of said disks for shifting said racks into mesh with said computation wheels, means controlled by the other of said disks for shifting said pinions into mesh with said wheels, means subsequently operated by the general operator for advancing said racks to turn said wheels either forwardly or backwardly, a pinion driven by said general operator, clutches between said pinion and said disks, means for closing either clutch and opening the other clutch, and a finger-piece connected to the last-named means.

30. The combination with a set of computation wheels, of driving racks normally out of mesh with said wheels, key-set pins for determining the extent of drive of said racks, a set of pinions meshing with said racks and normally out of mesh with said computation wheels, a general operator, an addition cam disk, a subtraction cam disk, means controlled by one of said disks for shifting said racks into mesh with said computation wheels, means controlled by the other of said disks for shifting said pinions into mesh with said wheels, means subsequently operated by the general operator for advancing said racks to turn said wheels either forwardly or backwardly, a pinion driven by said general operator, clutches between said pinion and said disks, means for closing either clutch and opening the other clutch, a finger-piece connected to the last-named means and carry-over mechanism having a clutch connection to said general operator pinion to be operated on the return stroke of the general operator; said finger-piece having means for reversing the direction in which said carry-over mechanism is driven by said general operator.

31. The combination with a set of computation wheels, of driving racks normally out of mesh with said wheels, key-set pins for determining the extent of drive of said racks, a set of pinions meshing with said racks and normally out of mesh with said computation wheels, a general operator, an addition cam disk, a subtraction cam disk, means controlled by one of said disks for shifting said racks into mesh with said computation wheels, means controlled by the other of said disks for shifting said pinions into mesh with said wheels, means subsequently operated by the general operator for advancing said racks to turn said wheels either forwardly or backwardly, a pinion driven by said general operator, clutch disks connected to said pinion, pawls on said cam disks to engage the clutch disks, means for releasing either pawl and simultaneously rendering the other pawl effective, and a finger-piece connected to the last-named means.

32. The combination with a set of computation wheels, of driving racks normally out of mesh with said wheels, key-set pins for determining the extent of drive of said racks, a set of pinions meshing with said racks and normally out of mesh with said computation wheels, a general operator, an addition cam disk, a subtraction cam disk, means controlled by one of said disks for shifting said racks into mesh with said computation wheels, means controlled by the other of said disks for shifting said pinions into mesh with said wheels, means subsequently operated by the general operator for advancing said racks to turn said wheels either forwardly or backwardly, a pinion driven by said general operator, clutch disks connected to said pinion, pawls on said cam disks to engage the clutch disks, means for releasing either pawl and simultaneously rendering the other pawl effective, a finger-piece connected to the last-named means, a carry-over mechanism having a clutch connection to said general operator pinion to be given a revolution thereby on the return stroke of the general operator, movement-reversing gearing between said carry-over mechanism and said general operator pinion, and means connected to said finger-piece for controlling said reversing gearing.

33. In a computing machine, the combination, with a set of numeral keys; of a single set of movable computation racks; key-set pins for determining the extent of movement of said racks; a general operator for positively driving said racks; a single set of carry-over trains operable by said general operator, all of said elements being mounted upon the stationary frame of the machine; a computer carriage arranged to travel relatively to said racks; and a plurality of separate sets of computing wheels mounted in line on said carriage, to enable any one set to be brought by said carriage during its travel into position for coöperation with said racks and said carry-over trains.

34. In a typewriting machine having a keyboard including numeral keys at its front, and a carriage in rear of the keyboard; a traveling computer carriage having thereon a series of spaced sets of computing wheels arranged in a row longitudinal thereof; wheel-operating devices mounted on one side of the frame-work of the machine and including denominational members controlled by said typewriter carriage, a system of pins, and a general operator for positively driving the wheels to variable extents determined by said pins, said computer carriage being arranged to bring any set of wheels into position to be driven by said general operator; means for setting the pins; and connections from said keys to said pin-setting means.

35. The combination with a typewriting machine having a keyboard at its front, and a carriage in the rear of the keyboard, said keyboard including numeral keys, of computing devices at one side of the typewriting machine adjacent to the typewriter carriage and having denominational members controlled by said carriage, said computing devices including computing wheels, a system of pins, means for setting the pins, connections from said keys to said pin-setting means, and a general operator comprising an upstanding arm beneath said computing devices, means carried by said arm at its upper end for engaging the pins to drive the wheels, and a carriage for said computing wheels mounted in front of said typewriter carriage and connected thereto.

36. The combination, with a traveling carriage, and a series of spaced sets of computing wheels mounted thereon; of a system of operating devices coöperable with all of said sets of wheels, for causing either addition or subtraction to be performed on any set, said operating devices including numeral keys, pins settable thereby, a single set of carry-over trains, and a general operator adapted to positively actuate said trains and to co-act with the set pins to positively drive said wheels to the extents determined by said pins, said carriage being arranged, during its travel, to bring any set of computing wheels into position to be driven by said general operator and to co-act with said carry-over trains.

37. The combination, with a traveling carriage, and a series of spaced sets of computing wheels mounted thereon; of a system of operating devices coöperable with all of said sets and including numeral keys, pins settable thereby, a single set of bars carrying said pins and having associated therewith separate wheel-driving means for causing addition and subtraction to be performed on said wheels, a single set of carry-over trains, and a general operator adapted to positively actuate said trains and to co-act with the set pins to positively drive said bars to the extents determined by said pins, said carriage being arranged, during its travel, to bring any set of computing wheels into position to be driven by said bars and to co-act with said carry-over trains; and means for rendering either the addition or the subtraction driving means effective with relation to the set of computing wheels so positioned before the rotation of said wheels commences.

38. The combination, with a traveling carriage, and a series of spaced sets of computing wheels mounted thereon; of a system of operating devices coöperable with all of said sets and including numeral keys, pins settable thereby, a single set of bars carrying said pins and having associated therewith separate wheel-driving means for causing addition and subtraction to be performed on said wheels, a single set of carry-over trains, and a general operator adapted to positively actuate said trains and to co-act with the set pins to positively drive said bars to the extents determined by said pins, said carriage being arranged, during its travel, to bring any set of computing wheels into position to be driven by said bars and to co-act with said carry-over trains; means for rendering either the addition or the subtraction driving means effective with relation to the set of computing wheels so positioned before the rotation of said wheels commences; and means for enabling said general operator to drive said carry-over trains in opposite directions at will.

39. In a computing machine, embodying a set of numeral keys, pins or devices settable thereby, a single set of actuating elements, and a general operator for directly and positively driving all of said actuating elements to the extents determined by the set pins; a plurality of spaced computing heads, each comprising a set of computing wheels; and a traveling carriage whereon all of said computing heads are mounted, said carriage being movable with relation to said actuating elements to bring, during its travel, any computing head into position to be driven thereby, said actuating elements having separate means associated therewith for rotating the corresponding wheels of the computing head so positioned either forwardly or backwardly.

40. In a computing machine, embodying a set of numeral keys, pins or devices settable thereby, a single set of actuating elements, and a general operator for directly and positively driving all of said actuating elements to the extents determined by the set pins; a plurality of spaced computing heads, each comprising a set of computing wheels; a traveling carriage whereon all of said computing heads are mounted, said carriage being movable with relation to said actuating elements to bring, during its travel, any computing head into position to be driven thereby, said actuating elements having separate means associated therewith for rotating the corresponding wheels of the computing head so positioned either forwardly or backwardly; and a single set of reversible carry-over trains positively operable by said general operator and arranged to co-act with the said positioned head, whereby said head may be caused to perform either addition or subtraction.

41. The combination with a typewriting machine, of a computer carriage at the front of the machine, computation racks at one side of the machine, a general operator at said side under the racks and comprising an arm, an electric motor behind the machine, a disk given a single rotation by the electric motor, and a link extending from said disk to said arm.

42. The combination with a typewriting machine, of a computer carriage at the front of the machine, computation racks at one side of the machine, a general operator at said side under the racks and comprising an arm, an electric motor behind the machine, a disk given a single rotation by the electric motor, a link extending from said disk to said arm, said disk having a slot, and said link having a wrist which can slide in said slot, and also having means for firmly securing the wrist to the disk, and a handle for operating the general operator at will.

43. The combination with a typewriting machine including a series of numeral keys, of a series of computing wheels strung across the front of said typewriting machine, said computing wheels being arranged in sets or groups to form totalizers, actuating means for concomitantly actuating all the wheels of one set or group, said actuating means being segregated alongside the typewriting machine and operative to run up numbers on a set or totalizer solely when said set is in position at one side of the machine in opposition to said actuating means, and denomination-controlling mechanism extending from a zone including the printing point of the typewriter off to the side of the machine to control the particular elements of said actuating means.

44. The combination with a series of computing wheels, of a series of racks for driving said computing wheels, floating idle pinions interposed between said racks and said computing wheels to reverse the direction of drive, a general operator for actuating said racks, said racks and said idle pinions being normally out of driving relation with said computing wheels when said general operator is in its normal stationary position, and means operated by said general operator for selectively causing either a direct drive from said racks to said computing wheels or an indirect reverse drive from said racks through said idle pinions to said computing wheels.

45. The combination with a series of computing wheels, of a series of racks for driving said computing wheels, floating idle pinions interposed between said racks and said computing wheels to reverse the direction of drive, a general operator for actuating said racks, said racks and said idle pinions being normally out of driving relation with said computing wheels when said general operator is in its normal stationary position, and means operated by said general operator for selectively causing either a direct drive from said racks to said computing wheels or an indirect reverse drive from said racks through said idle pinions to said computing wheels, said idle pinions being always in mesh with said racks and engaging to drive said computing wheels solely when said racks are disengaged to drive said computing wheels directly.

46. The combination with a series of computing wheels, of a series of racks for driving said computing wheels either directly or indirectly, and a series of idle pinions engaging said racks and shiftable to form intermediate gearing between said racks and said computing wheels, said idle pinions being normally out of driving relation with said computing wheels and always in mesh with said racks, and being floatingly mounted so as to yield away before said racks when said racks move to effect a direct drive of said computing wheels without the aid of said idle pinions.

47. The combination with a series of computing wheels, of a series of racks for driving said computing wheels, said racks being capable of driving said computing wheels either directly or indirectly, idle gearing constantly in mesh with said racks and normally disconnected from said computing wheels, for enabling the indirect drive between said racks and said computing wheels, and separate cams controlling individually the direct and indirect drives between said racks and said computing wheels.

48. The combination with a series of computing wheels, of a series of racks for driving said computing wheels, said racks being capable of driving said computing wheels either directly or indirectly, idle gearing constantly in mesh with said racks and normally disconnected from said computing wheels for enabling the indirect drive between said racks and said computing wheels, separate cams controlling individually the direct and indirect drives between said racks and said computing wheels, and controlling means for selectively determining which of said cams shall be effective.

49. The combination with a series of computing wheels, of a series of rack bars for rotating said computing wheels, each of said rack bars having a set of pins settable thereon to determine the extent of movement of said rack bars, means for depressing said rack bars to effect a setting of one of the pins thereon, means for raising said rack bars to effect a direct driving connection between said rack bars and said computing wheels, and a general operator for directly reciprocating said rack bars longitudinally to effect a rotation of said computing wheels an extent determined by the set pins on said rack bars.

50. The combination with a typewriting machine including a keyboard having a series of numeral keys, of a series of computing wheels, a nest of settable pins for determining the extent of rotation of said computing wheels, there being a series of pins for each computing wheel, said nest of pins being located above the level of said keyboard, connections between said pins and said computing wheels, and connections between said numeral keys and said pins to enable the setting of said pins by said numeral keys.

51. The combination with a typewriting mechanism including a keyboard and a carriage, said keyboard having a series of numeral keys, of a series of computing wheels, and a series of denominational bars for driving said computing wheels, each of said bars having a series of pins thereon settable to determine the extent of rotation of said computing wheels, said set of bars being located above the level of said keyboard.

52. The combination with a typewriting mechanism including a keyboard and a carriage, said keyboard having a series of numeral keys, of a series of computing wheels, and a series of denominational bars for driving said computing wheels, each of said bars having a series of pins settable thereon to determine the extent of rotation of said computing wheels, said set of denominational bars being located intermediate the levels of said keyboard and said carriage.

53. In a computing machine, the combination with a traveling carriage and a bank of computing wheels, of an array of rack bars for driving said wheels and always effective in the same direction, subtraction devices interposable between said rack bars and said wheels, carry-over devices for said wheels, and a reversible carry-over shaft for driving said carry-over devices.

54. In a combined typewriting and computing machine, the combination with rack bars comprising settable pins set in rows extending across said rack bars, of pin-setting linkages for said pins, each linkage including a parallel motion device, which comprises a pin-setting bar and a pair of bell crank levers carrying it, and a key-operated thrust rod pivoted directly to the bar and giving said bar a direct thrust.

55. In a combined typewriting and computing machine, the combination with numeral keys and computing wheels, of rack bars for driving said wheels, a general operator for driving said rack bars so that the rack bars are always effective on the wheels in the same direction, subtraction devices for causing said rack bars to drive the computing wheels to subtract, a source of power separate from the numeral keys for turning said wheels by said rack bars, and means moved by said source of power for causing said subtraction devices to become effective and then enable the wheels to be turned by the rack bars.

56. In a combined typewriting and computing machine, the combination with numeral keys and computing wheels, of a traveling carriage, a denomination selector on said carriage, arms moved *seriatim* by said selector, an arm for each computing wheel, a shaft on which said arms are journaled, and a set of nested bails connecting said arms in pairs in reverse order.

57. In a combined typewriting and computing machine, the combination with numeral keys, computing wheels and a traveling carriage, of a denomination selector mounted on said carriage, a series of arms moved by said selector, a corresponding set of arms one for each computing wheel, and members integral with said arms connecting said arms in pairs.

58. In a combined typewriting and computing machine, the combination with numeral keys, computing wheels and a traveling carriage, of a denomination selector forming part of said carriage, a series of cam-faced pivoted members adapted to be engaged *seriatim* by said selector, said selector having a cam face for so engaging them, a corresponding arm for each computing wheel, and bails connecting said arms in pairs to form integral members.

59. In a combined typewriting and computing machine, the combination with numeral keys, computing wheels and a traveling carriage, of a denomination selector forming part of said carriage, a computing mechanism at one side of said carriage, a horizontal shaft extending adjacent the travel of said carriage, and a series of bails on said shaft forming a nest, said bails having arms adapted to be cammed by said selector to partly rotate said bails, and having other arms to determine at each letter-space on what computing wheel the key operated may be effective to cause computation.

60. The combination, with a series of computing wheels; of a series of racks, one individual to each of said computing wheels, for driving the same; means for shifting said racks into direct drive with said computing wheels; a series of intermediary pinions constantly in engagement with said racks; and means for creeping said pinions along said racks into engagement with said computing wheels, to form an indirect driving connection between said racks and said computing wheels.

61. The combination, with a series of computing wheels; of a series of racks, one individual to each of said computing wheels, for driving the same; a series of intermediary pinions constantly in engagement with said racks; and means for creeping said pinions along said racks into engagement with said computing wheels, to form an indirect driving connection between said racks and said computing wheels.

62. In a combined typewriting and computing machine, embodying a traveling carriage, a tappet on said carriage, and computation members normally in ineffective position and disposed at a point remote from said carriage; transposition members operable *seriatim* by said tappet to move the corresponding computation members into effective position, each transposition member having a bearing adjacent the said tappet and a bearing adjacent the companion computation member.

63. In a combined typewriting and computing machine, embodying computation members normally in ineffective position; transposition members, one for each computation member, to move the same into effective position, each transposition member including an integral bail.

64. In a combined typewriting and computing machine, embodying computation members normally in ineffective position; transposition members, one for each computation member, to move the same into effective position, each transposition member including a bail, said bails being nested.

65. In a combined typewriting and computing machine, embodying computation members normally in ineffective position; transposition members, one for each computation member, to move the same into effective position, each transposition member including a bail having bearings therefor at opposite ends, said bails being nested.

66. In a combined typewriting and computing machine, embodying a traveling carriage, a tappet on said carriage, and computation members normally in ineffective position and disposed at a point remote from said carriage; transposition members operable *seriatim* by said tappet to move the corresponding computation members into effective position, each transposition member including a vertically-swinging arm which co-acts with said tappet and a vertically-swinging arm which co-acts with the companion computation member.

67. In a combined typewriting and computing machine, embodying a traveling carriage, a tappet on said carriage, and computation members normally in ineffective position and disposed at a point remote from said carriage; transposition members operable *seriatim* by said tappet to move the corresponding computation members into effective position, each transposition member including a bail having an extension which co-acts with the said tappet and an extension which co-acts with the companion computation member.

68. In a combined typewriting and computing machine, embodying computation members normally in ineffective position; a nest of rocking transposition members for moving the corresponding computation members into effective position; and a shaft whereon all of said transposition members are journaled.

69. In a combined typewriting and computing machine, embodying computation members normally in ineffective position; a nest of bail-shaped rocking transposition members for moving the corresponding computation members into effective position; and a shaft whereon all of said transposition members are journaled.

70. In a combined typewriting and computing machine, embodying computation members normally in ineffective position; a nest of rocking, horizontal, transposition members for moving the corresponding computation members into effective position; and a horizontal shaft whereon all of said transposition members are journaled.

71. In a combined typewriting and computing machine, embodying a traveling carriage, a tappet on said carriage, and computation members normally in ineffective position and disposed at a point remote from said carriage; transposition members operable *seriatim* by said tappet to move the corresponding computation members into effective position, each transposition member including a bail having an extension which co-acts with the said tappet and an extension which co-acts with the companion computation member, each of said extensions having a bearing.

72. In a combined typewriting and computing machine, embodying a traveling carriage, a tappet on said carriage, and computation members normally in ineffective position and disposed at a point remote from said carriage; transposition members operable *seriatim* by said tappet to move the corresponding computation members into effective position, each transposition member including a bail having an extension which co-acts with the said tappet and an extension which co-acts with the companion computation member; and a shaft whereon all of said transposition members are mounted.

73. In a combined typewriting and computing machine, embodying computation members normally in ineffective position; a nest of rocking transposition members for moving the corresponding computation members into effective position, said transposition members having laterally offset ends provided with alining bearings; and a supporting shaft passing through all of said bearings.

74. The combination, with a computer carriage, and a plurality of spaced computing heads thereon, each computing head comprising a set of computing wheels provided with driving pinions and with starting devices; of a single set of racks, said carriage being arranged to travel relatively to said racks to bring any one of said computing heads into position to co-act therewith; a single set of carry-over trains adapted to be started by the starting devices of the computing head brought into such position; and a general operator acting to initially shift said racks into mesh with the pinions of the computing head so positioned, and to subsequently drive the meshed racks, said general operator having means for driving said trains one after another.

BURNHAM C. STICKNEY.

Witnesses:
C. RIPLEY,
B. GOLDBERG.

Copies of this patent may be obtained for five cents each, by addressing the "Commissioner of Patents, Washington, D. C."